US009151018B2

(12) United States Patent
Knussman

(10) Patent No.: US 9,151,018 B2
(45) Date of Patent: Oct. 6, 2015

(54) CLOSED-LOOP HYDRAULIC SYSTEM HAVING ENERGY RECOVERY

(75) Inventor: Michael L. Knussman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 805 days.

(21) Appl. No.: 13/250,002

(22) Filed: Sep. 30, 2011

(65) Prior Publication Data

US 2013/0081383 A1 Apr. 4, 2013

(51) Int. Cl.

| | |
|---|---|
| ***F16D 31/02*** | (2006.01) |
| ***F15B 13/04*** | (2006.01) |
| ***E02F 9/22*** | (2006.01) |
| ***F15B 11/16*** | (2006.01) |
| *F15B 15/14* | (2006.01) |

(52) U.S. Cl.

CPC ............. *E02F 9/2217* (2013.01); *E02F 9/2289* (2013.01); *E02F 9/2296* (2013.01); *F15B 11/16* (2013.01); *F15B 15/1476* (2013.01); *F15B 2211/20546* (2013.01); *F15B 2211/20561* (2013.01); *F15B 2211/20569* (2013.01); *F15B 2211/255* (2013.01); *F15B 2211/27* (2013.01); *F15B 2211/30575* (2013.01); *F15B 2211/327* (2013.01); *F15B 2211/351* (2013.01); *F15B 2211/625* (2013.01); *F15B 2211/6346* (2013.01); *F15B 2211/665* (2013.01); *F15B 2211/6652* (2013.01); *F15B 2211/6654* (2013.01); *F15B 2211/7053* (2013.01); *F15B 2211/7107* (2013.01); *F15B 2211/7128* (2013.01); *F15B 2211/88* (2013.01)

(58) Field of Classification Search

CPC ........ F15B 11/006; F15B 11/16; F15B 21/14; F15B 2211/30575; F15B 2211/88; E02F 9/2217; E02F 9/2242

USPC ............................................... 60/414; 91/454

See application file for complete search history.

(56) References Cited

U.S. PATENT DOCUMENTS 4,369,625 A 1/1983 Izumi et al.
4,449,366 A 5/1984 Sato et al.

(Continued)

FOREIGN PATENT DOCUMENTS

EP 1 598 561 11/2005
GB 2 269 425 2/1994

(Continued)

OTHER PUBLICATIONS

Zick, J., entitled "Verbesserte Leistungsausnutzung bei Erdbaumaschinen durch optimal Pumpensteuerung", Olhydraulic und pneumatic 20 (1976) Nr. 4.

(Continued)

*Primary Examiner* — Michael Leslie

(74) *Attorney, Agent, or Firm* — Finnegan, Henderson, Farabow, Garrett & Dunner, LLP

(57) ABSTRACT

A hydraulic system is disclosed. The hydraulic system may have a pump with variable-displacement, a first linear actuator, and a second linear actuator coupled to the first linear actuator to operate in tandem. The first and second linear actuators may be connected to the pump in closed-loop manner, and each of the first and second linear actuators may have a first chamber and a second chamber separated by a piston. The hydraulic system may also have an accumulator in fluid communication with the second chamber of only the second linear actuator.

17 Claims, 2 Drawing Sheets

(56) References Cited

U.S. PATENT DOCUMENTS

| | | | | |
|---|---|---|---|---|
| 4,561,249 | A | 12/1985 | Watanabe et al. | |
| 4,586,330 | A | 5/1986 | Watanabe et al. | |
| 4,768,339 | A | 9/1988 | Aoyagi et al. | |
| 4,833,798 | A | 5/1989 | Ehrich | |
| 5,048,293 | A | 9/1991 | Aoyagi | |
| 5,329,767 | A | 7/1994 | Hewett | |
| 6,330,797 | B1 | 12/2001 | Kondo | |
| 6,745,992 | B2 | 6/2004 | Yang et al. | |
| 6,748,738 | B2 * | 6/2004 | Smith | 60/414 |
| 6,789,335 | B1 | 9/2004 | Kinugawa et al. | |
| 6,918,247 | B1 | 7/2005 | Warner | |
| 7,243,591 | B2 | 7/2007 | Dixen et al. | |
| 7,260,931 | B2 | 8/2007 | Egelja et al. | |
| 7,272,928 | B2 | 9/2007 | Ariga et al. | |
| 7,412,827 | B2 | 8/2008 | Verkuilen | |
| 7,434,391 | B2 | 10/2008 | Asam et al. | |
| 7,490,421 | B1 | 2/2009 | Pletzer et al. | |
| 7,516,613 | B2 | 4/2009 | Kadlicko | |
| 7,634,911 | B2 | 12/2009 | Brinkman | |
| 7,827,787 | B2 * | 11/2010 | Cherney et al. | 60/414 |
| 8,418,451 | B2 * | 4/2013 | Stanger et al. | 60/414 |
| 2004/0083629 | A1 | 5/2004 | Kondou | |
| 2004/0123499 | A1 | 7/2004 | Arii | |
| 2005/0012337 | A1 | 1/2005 | Yoshimatsu | |
| 2005/0036894 | A1 | 2/2005 | Oguri | |
| 2007/0044463 | A1 | 3/2007 | VerKuilen et al. | |
| 2008/0250783 | A1 | 10/2008 | Griswold | |
| 2008/0300757 | A1 | 12/2008 | Kanayama et al. | |
| 2008/0314038 | A1 | 12/2008 | Tozawa et al. | |
| 2009/0165450 | A1 | 7/2009 | Cherney et al. | |
| 2009/0288408 | A1 | 11/2009 | Tozawa et al. | |
| 2010/0000209 | A1 | 1/2010 | Wada et al. | |
| 2010/0000211 | A1 | 1/2010 | Ikeda et al. | |
| 2010/0043420 | A1 | 2/2010 | Ikeda et al. | |
| 2010/0107620 | A1 | 5/2010 | Nelson et al. | |
| 2010/0115936 | A1 | 5/2010 | Williamson et al. | |
| 2010/0162593 | A1 | 7/2010 | Hughes, IV et al. | |
| 2010/0162885 | A1 | 7/2010 | Hughes, IV et al. | |
| 2010/0163258 | A1 | 7/2010 | Hughes, IV et al. | |
| 2010/0218493 | A1 | 9/2010 | Nakamura et al. | |
| 2011/0029206 | A1 | 2/2011 | Kang et al. | |
| 2011/0030364 | A1 | 2/2011 | Persson et al. | |
| 2012/0324877 | A1 * | 12/2012 | Kang | 60/459 |

FOREIGN PATENT DOCUMENTS

| | | |
|---|---|---|
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2004-116675 | 4/2004 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |
| WO | 2011-078586 | 6/2011 |

OTHER PUBLICATIONS

U.S. Appl. No. 13/278,720 of Patrick Opdenbosch, entitled "Meterless Hydraulic System Having Multi-Circuit Recuperation", filed Oct. 21, 2011.

U.S. Appl. No. 13/278,623 of Patrick Opdenbosch, entitled "Closed-Loop Hydraulic System Having Flow Combining and Recuperation", filed Oct. 21, 2011.

U.S. Appl. No. 13/278,924 of Patrick Opdenbosch et al., entitled "Meterless Hydraulic System Having Flow Sharing and Combining Functionality", filed Oct. 21, 2011.

U.S. Appl. No. 13/279,064 of Patrick Opdenbosch et al., entitled "Meterless Hydraulic System Having Flow Sharing and Combining Functionality", filed Oct. 21, 2011.

U.S. Appl. No. 13/279,177 of Patrick Opdenbosch et al., entitled "Meterless Hydraulic System Having Flow Sharing and Combining Functionality", filed Oct. 21, 2011.

U.S. Appl. No. 13/278,556 of Michael L. Knussman, entitled "Closed-Loop Hydraulic System Having Regeneration Configuration", filed Oct. 21, 2011.

U.S. Appl. No. 13/278,894 of Patrick Opdenbosch, entitled "Hydraulic System Having Flow Combining Capabilities", filed Oct. 21, 2011.

U.S. Appl. No. 13/278,895 of Michael L. Knussman et al., entitled "Hydraulic System", filed Oct. 21, 2011.

U.S. Appl. No. 13/278,939 of Michael L. Knussman, entitled "Hydraulic System", filed Oct. 21, 2011.

U.S. Appl. No. 13/278,745 of Brad A. Edler et al., entitled "Closed-Loop System Having Multi-Circuit Flow Sharing", filed Oct. 21, 2011.

U.S. Appl. No. 13/278,650 of Michael L. Knussman, entitled "Hydraulic System Having Multiple Closed-Loop Circuits", filed Oct. 21, 2011.

U.S. Appl. No. 13/278,479 of Brad A. Edler et al., entitled "Closed-Loop Hydraulic System Having Priority-Based Sharing", filed Oct. 21, 2011.

U.S. Appl. No. 13/278,589 of Michael L. Knussman, entitled "Hydraulic System Having Multiple Closed-Loop Circuits", filed Oct. 21, 2011.

U.S. Appl. No. 13/278,788 of Jeffrey L. Kuehn et al., entitled "Closed-Loop Hydraulic System Having Force Modulation", filed Oct. 21, 2011.

U.S. Appl. No. 13/278,491 of Jeffrey L. Kuehn et al., entitled "Meterless Hydraulic System Having Sharing and Combining Functionality", filed Oct. 21, 2011.

U.S. Appl. No. 13/278,935 of Michael L. Knussman et al., entitled "Hydraulic System", filed Oct. 21, 2011.

Linjama, M. (2011) entitled "Digital Fluid Power-State of the Art", The $12^{th}$ Scandinavian International Conference on Fluid Power, May 18-20, 2011 Tampere, Finland.

Zimmerman, J. PhD Student/Purdue University, Center for Compact and Efficient Fluid Power PowerPoint Presentation, Annual Meeting (Jun. 14).

Zimmerman, J. et al., "Hybrid Displacement Controlled Multi-Actuator Hydraulic Systems", The Twelfth Scandinavian International Conference on Fluid Power , Tampere, Finland (May 18-20, 2011).

Brezonick, M., entitled "The Potential of Pump-Controlled Hydraulics", Hydraulic Horizons, Diesel Progress North American Edition (Jan. 2009).

U.S. Appl. No. 13/222,895 by Patrick Opdenbosch et al., entitled "Meterless Hydraulic System Having Displacement Control Valve", filed Aug. 31, 2011.

U.S. Appl. No. 13/222,945 by Patrick Opdenbosch et al., entitled "Meterless Hydraulic System Having Restricted Primary Makeup", filed Aug. 31, 2011.

U.S. Appl. No. 13/222,990 by Patrick Opdenbosch et al., entitled "Meterless Hydraulic System Having Load-Holding Bypass", filed Aug. 31, 2011.

Linde Hydraulics Brochure entitled "HPV-02. Variable Pumps for Closed Loop Operation", available at least as early as Aug. 31, 2011, pp. 1-36.

Grabbel at al., "An investigation of swash plate control concepts for displacement controlled actuators," International Journal of Fluid Power, 2005, 6(2), pp. 19-36.

Wang et al., "A hydraulic circuit with dynamical compensations," Institute for Fluid Power Education, 52nd National Conference on Fluid Power (IFPE 2011), Session 19.3, 529-538 (Las Vegas, Nevada, Usa, Mar. 24. 2011).

Williamson et al., "Stability and motion control of inertial loads with displacement controlled hydraulic actuators," Proceedings of the 6th Fluid Power Network International (FPNI) Ph.D. Symposium (West Lafayette, Indiana,USA, Jun. 15-19, 2010).

* cited by examiner

CLOSED-LOOP HYDRAULIC SYSTEM HAVING ENERGY RECOVERY

TECHNICAL FIELD

The present disclosure relates generally to a hydraulic system and, more particularly, to a closed-loop hydraulic system having energy recovery.

BACKGROUND

Machines such as excavators, dozers, loaders, motor graders, and other types of heavy equipment use one or more hydraulic actuators to move a work tool. These actuators are fluidly connected to a pump on the machine that provides pressurized fluid to chambers within the actuators. As the pressurized fluid moves into or through the chambers, the pressure of the fluid acts on hydraulic surfaces of the chambers to affect movement of the actuator and the connected work tool. In an open-loop hydraulic system, fluid discharged from the actuator is directed into a low-pressure sump, from which the pump draws fluid. In a closed-loop hydraulic system, fluid discharged from the actuator is directed back into the pump and immediately recycled.

One problem associated with these types of hydraulic systems involves efficiency. In particular, the fluid discharged from the actuator can still have an elevated pressure, which represents unused hydraulic energy. In some situations, for example during overrunning conditions, this fluid discharged from the actuator can actually have a higher pressure than fluid entering the actuator. Unless captured and reused, the energy contained in the discharging fluid may be wasted, thereby lowering an efficiency of the hydraulic system. The efficiency may be lowered even further when the fluid is discharged into a low-pressure sump, as is the situation with open-loop systems.

A problem associated primarily with closed-loop hydraulic systems involves the need for significant fluid makeup and relief capacity. Specifically, the respective rates of hydraulic fluid flow into and out of different chambers of an actuator during different movements may not be equal. For example, because of the location of a rod within a first chamber of a hydraulic cylinder, an associated piston assembly may have a reduced pressure area within the first chamber, as compared with a pressure area within an opposing second chamber that does not include the rod. Accordingly, during retraction of the hydraulic cylinder, more hydraulic fluid may be forced out of the second chamber than can be consumed by the first chamber and, during extension, more hydraulic fluid may be consumed by the second chamber than is forced out of the first chamber. To accommodate these differences in fluid flows, closed-loop hydraulic systems commonly include makeup and relief circuits that provide additional fluid to the system (e.g., to the second chamber during extension) and/or consume excess fluid from the system (e.g., from the second chamber during retraction). These circuits, although imparting functionality to the associated systems, can increase cost and complexity of the system, while also consuming valuable space.

One method of improving the efficiency of a hydraulic system is described in U.S. Pat. No. 6,918,247 issued to Warner on Jul. 19, 2005 (the '247 patent). The '247 patent describes an open-loop hydraulic system having a pump configured to draw fluid from a low-pressure tank, pressurize the fluid, and direct the pressurized fluid into a boom actuator connected to pivot a boom of a machine. The system also includes an assist cylinder coupled to the boom of the machine, and an accumulator connected to one chamber of the assist cylinder. During movements of the boom from a high-potential energy position to a low-potential energy position (e.g., during lowering of the boom), gas within the assist cylinder is compressed. During a subsequent movement to the boom from the low potential energy position to the high potential energy position, the previously compressed gas is then allowed to expand and assist movement of the boom, thereby lowering an amount of energy required by the boom actuator to lift the boom.

Although the system of the '247 patent may help to improve efficiency through energy recuperation during an overrunning condition, it may still be less than optimal. In particular, the system may still be an open-loop system having associated throttling losses. In addition, because the system utilizes two different media (hydraulic fluid and compressible gas), the system may be overly complex and care should be taken to avoid cross-contamination of the media. Further, the system of the '247 patent may have no effect on the need for makeup or relief capacity in a closed-loop system.

The hydraulic system of the present disclosure is directed toward solving one or more of the problems set forth above and/or other problems of the prior art.

SUMMARY

In one aspect, the present disclosure is directed to a hydraulic system. The hydraulic system may include a pump having variable-displacement, a first linear actuator, and a second linear actuator coupled to the first linear actuator to operate in tandem. The first and second linear actuators may be connected to the pump in closed-loop manner, and each of the first and second linear actuators may have a first chamber and a second chamber separated by a piston. The hydraulic system may also include an accumulator in fluid communication with the second chamber of only the second linear actuator.

In another aspect, the present disclosure is directed to a method of operating a hydraulic system. The method may include pressurizing fluid with a pump, and directing fluid pressurized by the pump into first and second linear actuators operating in tandem and returning fluid from the first and second linear actuators to the pump via a closed-loop circuit. The method may also include accumulating fluid from and discharging accumulated fluid into a head-end chamber of only the second linear actuator.

DETAILED DESCRIPTION

Figure 1:
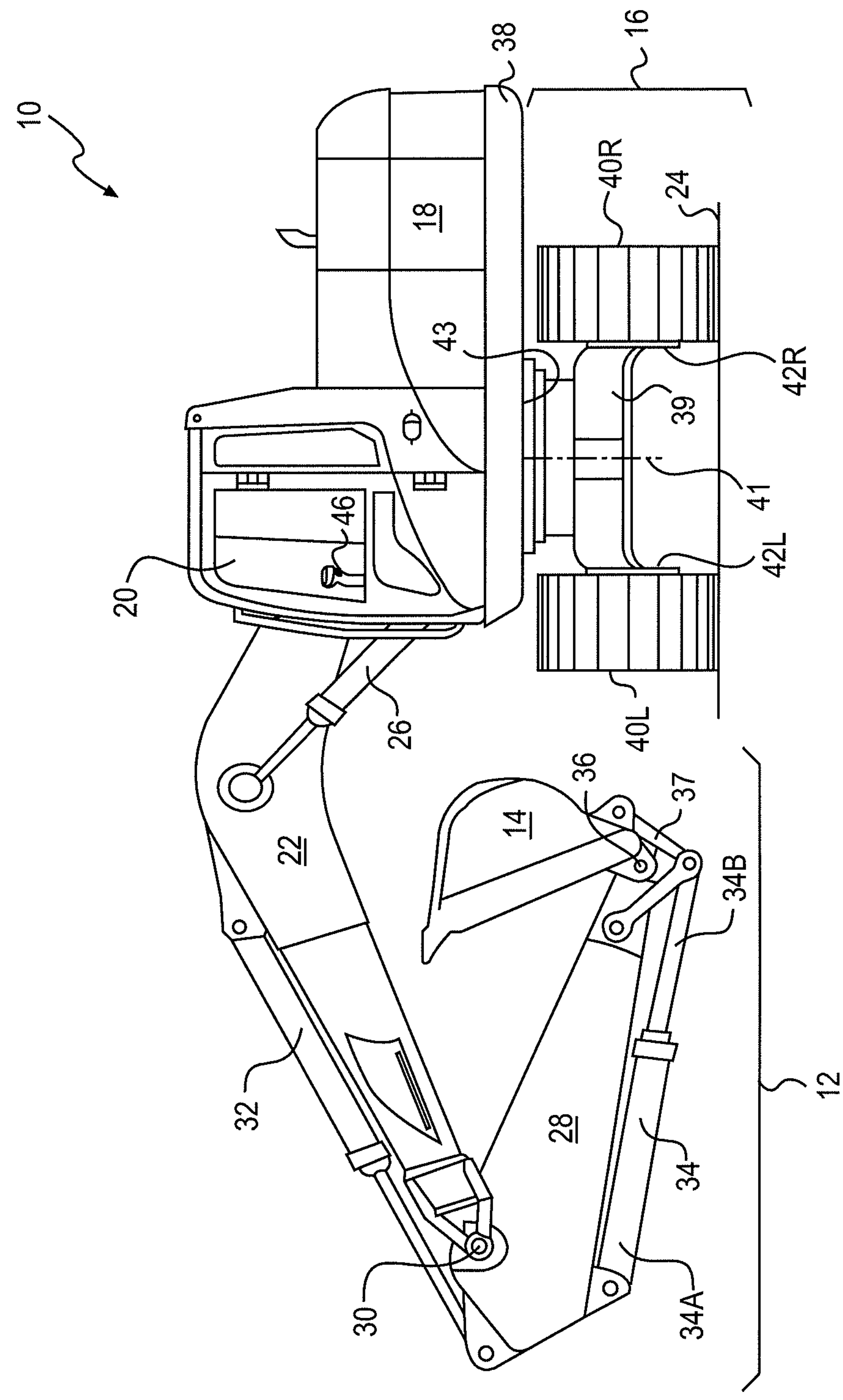
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or another earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by linear and rotary fluid actuators to move work tool 14. For example, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected at a base end to a body 38 of machine 10. Body 38 may be connected to an undercarriage 39 to swing about a vertical axis 41 by a hydraulic swing motor 43. Stick 28 may pivotally connect a distal end of boom 22 to work tool 14 by way of axes 30 and 36.

Numerous different work tools 14 may be attachable to a single machine 10 and operator controllable. Work tool 14 may include any device used to perform a particular task such as, for example, a bucket (shown in FIG. 1), a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction about pivot axis 41, work tool 14 may alternatively or additionally rotate relative to stick 28, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks, such as wheels, belts, or other known traction devices. Machine 10 may be steered by generating a speed and/or rotational direction difference between left and right travel motors 42L, 42R, while straight travel may be facilitated by generating substantially equal output speeds and rotational directions of left and right travel motors 42L, 42R.

Power source 18 may embody an engine such as, for example, a diesel engine, a gasoline engine, a gaseous fuel-powered engine, or another type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving the linear and rotary actuators of implement system 12.

Operator station 20 may include devices that receive input from a machine operator indicative of desired maneuvering. Specifically, operator station 20 may include one or more operator interface devices 46, for example a joystick (shown in FIG. 1), a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
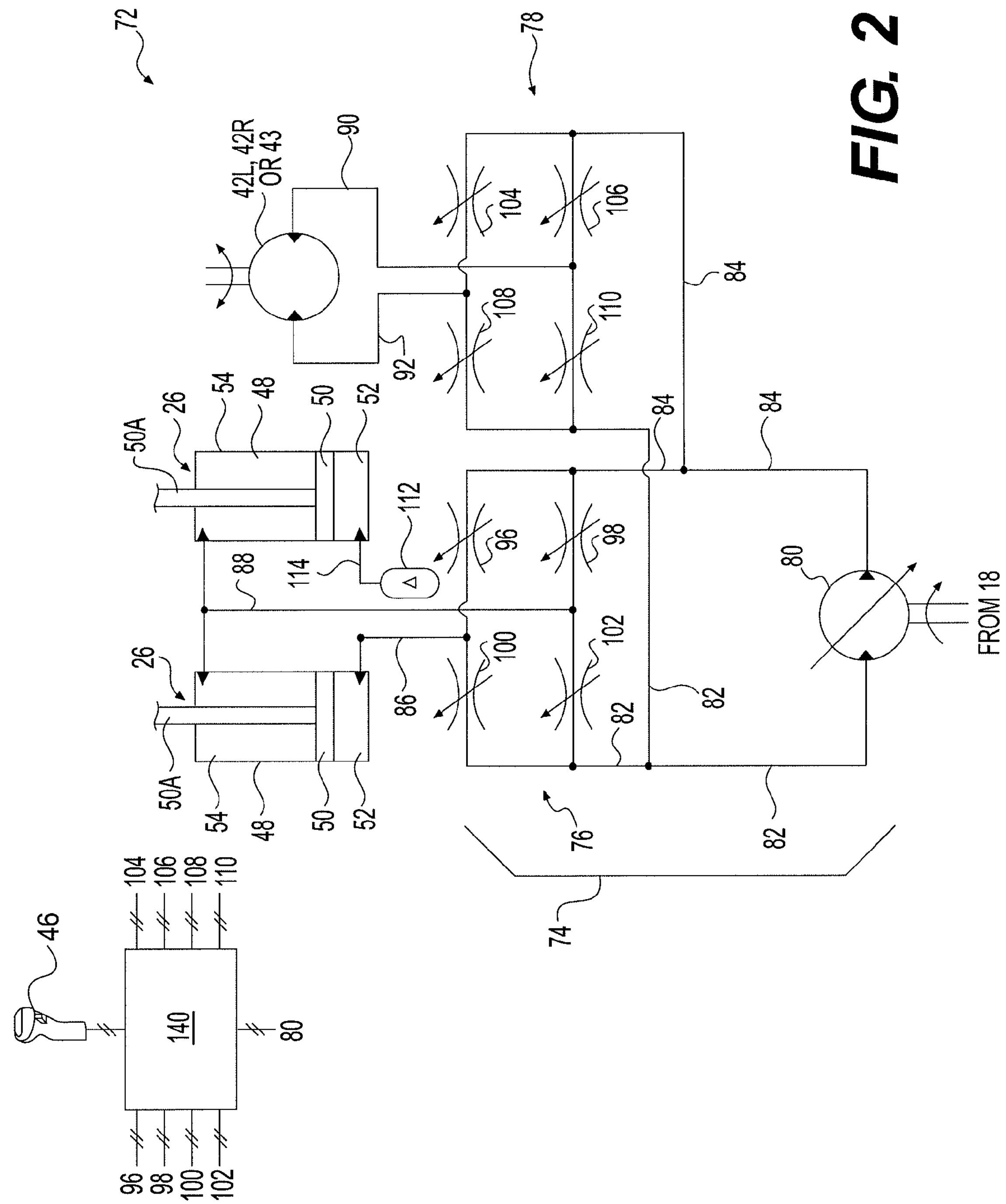
FIG. 2 is a schematic illustration of an exemplary disclosed hydraulic system that may be used in conjunction with the machine of FIG. 1.

As shown in FIG. 2, each hydraulic cylinder 26 may include a tube 48 and a piston assembly 50 arranged within tube 48 to form a first chamber 52 and an opposing second chamber 54. In one example, a rod portion 50A of piston assembly 50 may extend through an end of second chamber 54. As such, each second chamber 54 may be considered the rod-end chamber of the respective hydraulic cylinder 26, while each first chamber 52 may be considered the head-end chamber.

First chambers 52 and second chambers 54 may each be selectively supplied with pressurized fluid in parallel with each other, respectively, and drained of the pressurized fluid in parallel to cause piston assembly 50 to displace within tube 48, thereby changing the effective lengths of hydraulic cylinders 26 in tandem to move boom 22 (e.g., to raise and lower boom 22) relative to body 38 (referring to FIG. 1). A flow rate of fluid into and out of first and second chambers 52, 54 may relate to a translational velocity of hydraulic cylinders 26, while a pressure differential between first and second chambers 52, 54 may relate to a force imparted by hydraulic cylinders 26 on boom 22.

It will be appreciated by those of skill in the art that the respective rates of hydraulic fluid flow into and out of first and second chambers of hydraulic cylinders 26 during extension and retraction may not be equal. For example, because of the location of rod portion 50A within second chamber 54 of each hydraulic cylinder 26, piston assembly 50 may have a reduced pressure area within second chamber 54, as compared with a pressure area within first chamber 52 that does not include a rod portion. In the disclosed example, the pressure area of first chamber 52 may be about twice the pressure area of second chamber 54. Accordingly, during retraction of hydraulic cylinders 26, about twice as much hydraulic fluid may be forced out of first chambers 52 than can be simultaneously consumed by second chambers 54 and, during extension, about twice as much hydraulic fluid may be consumed by first chambers 52 than can be simultaneously forced out of second chambers 54.

Although FIG. 2 illustrates a single rotary actuator, it should be noted that the depicted rotary actuator may represent any one or more of left travel motor 42L, right travel motor 42R, and swing motor 43. Each rotary actuator, like hydraulic cylinders 26 described above, may be driven by a fluid pressure differential. Specifically, each rotary actuator may include first and second chambers located to either side of a pumping mechanism such as an impeller, plunger, or series of pistons. When the first chamber is filled with pressurized fluid and the second chamber is simultaneously drained of fluid, the pumping mechanism may be urged to rotate in a first direction by a pressure differential across the pumping mechanism. Conversely, when the first chamber is drained of fluid and the second chamber is simultaneously filled with pressurized fluid, the pumping mechanism may be urged to rotate in an opposite direction by the pressure differential. The flow rate of fluid into and out of the first and second chambers may determine a rotational velocity of the rotary actuator, while a magnitude of the pressure differential across the pumping mechanism may determine an output torque.

In the disclosed embodiment, the rotary actuator shown in FIG. 2 is depicted as a fixed displacement motor. It is contemplated, however, that a displacement of any one or all of the rotary actuators of machine 10 may be variable, if desired, such that for a given flow rate and/or pressure of supplied fluid, a speed and/or torque output of a particular rotary actuator may be selectively and independently adjusted.

Although not shown, it is contemplated that hydraulic cylinders 32 and 34 (referring to FIG. 1) may embody linear actuators similar to hydraulic cylinders 26 shown in FIG. 2 and may be connected to pump 80 in parallel with hydraulic cylinders 26 or, alternatively, separately connected to one or more different pumps. It is also contemplated that other actuators, for example auxiliary actuators, may be utilized within machine 10, and embody rotary actuators similar to left travel, right travel or swing motors 42L, 42R, 43, or linear actuators similar to hydraulic cylinders 26, as desired. For purposes of simplicity, hydraulic cylinders 32 and 34 and their associated fluid connections are omitted from FIG. 2.

Machine 10 may include a hydraulic system 72 having a plurality of fluid components that cooperate with the linear and rotary actuators described above to move work tool 14 (referring to FIG. 1) and machine 10. In particular, hydraulic system 72 may include, among other things, a circuit 74 fluidly connecting a pump 80 with the different actuators of machine 10, a first valve arrangement 76 associated with control of hydraulic cylinders 26, and a second valve arrangement 78 associated with control of the rotary actuator(s). It is contemplated that hydraulic system 72 may include additional and/or different circuits or components, if desired, such as a charge circuit, an energy storage circuit, switching valves, makeup valves, relief valves, and other circuits or valves known in the art.

Circuit 74 may include multiple different passages that fluidly connect pump 80 to hydraulic cylinders 26 and the rotary actuator(s) in a parallel, closed-loop manner. Specifically, pump 80 may be connected to hydraulic cylinders 26 via a pump intake passage 82, a pump discharge passage 84, a head-end passage 86, and a rod-end passage 88. In addition, pump 80 may be connected to the rotary actuator(s) via pump intake and discharge passages 82, 84, and individual actuator passages 90, 92.

Pump 80 may have variable displacement and be controlled to draw fluid from its associated actuators and discharge the fluid at a specified elevated pressure back to the actuators in a single direction (i.e., pump 80 may be a unidirectional pump). Pump 80 may include a stroke-adjusting mechanism, for example a swashplate, a position of which is hydro-mechanically adjusted based on, among other things, a desired speed of the actuators to thereby vary an output (e.g., a discharge rate) of pump 80. The displacement of pump 80 may be adjusted from a zero displacement position at which substantially no fluid is discharged from pump 80, to a maximum displacement position at which fluid is discharged from pump 80 at a maximum rate into discharge passage 82. Pump 80 may be drivably connected to power source 18 of machine 10 by, for example, a countershaft, a belt, or in another suitable manner. Alternatively, pump 80 may be indirectly connected to power source 18 via a torque converter, a gear box, an electrical circuit, or in any other manner known in the art. It is contemplated that pump 80 may be connected to power source 18 in tandem (e.g., via the same shaft) or in parallel (e.g., via a gear train) with other pumps (not shown) of machine 10, as desired. It is also contemplated that pump 80 may alternatively be an over-center pump, if desired.

Pump 80 may also be selectively operated as a motor. More specifically, when an associated actuator is operating in an overrunning condition (i.e., a condition where a load on an actuator and direction of the actuator are in the same direction), the fluid discharged from the actuator may have a pressure elevated above an output pressure of pump 80. In this situation, the elevated pressure of the actuator fluid directed back through pump 80 may function to drive pump 80 to rotate with or without assistance from power source 18. Under some circumstances, pump 80 may even be capable of imparting energy to power source 18, thereby improving an efficiency and/or capacity of power source 18.

First valve arrangement 76 may provide for selective flow control of fluid from pump 80 into and out of hydraulic cylinder(s) 26. In the disclosed embodiment, first valve arrangement 76 may include four independent metering valves. For example, first valve arrangement 76 may include a head-end supply valve 96, a rod-end supply valve 98, a head-end drain valve 100, and a rod-end drain valve 102. Head-end supply valve 96 may be disposed between pump discharge passage 84 and head-end passage 86 that leads to first chamber 52 of only the left-most hydraulic cylinder 26 shown in FIG. 2. Rod-end supply valve 98 may be disposed between pump discharge passage 84 and rod-end passage 88 that extends in parallel to second chambers 54 of both hydraulic cylinders 26. Head-end drain valve 100 may be disposed between head-end passage 86 and pump intake passage 82. Rod-end drain valve 102 may be disposed between rod-end passage 88 and pump intake passage 82. Head- and rod-end supply valves 96, 98 may be used to selectively meter fluid flow into the first chamber 52 of the left-most hydraulic cylinder 26 and into second chambers 54 of both hydraulic cylinders 26, respectively. Head- and rod-end drain valves 100, 102 may be used to selectively meter fluid flow out of the first chamber 52 of the left-most hydraulic cylinder 26 and out of second chambers 54 of both hydraulic cylinders 26, respectively.

Second valve arrangement 78 may provide for selective flow control of fluid from pump 80 into and out of the rotary actuator(s). In the disclosed embodiment, second valve arrangement 78 may include four independent metering valves. For example, second valve arrangement 78 may include a first-side supply valve 104, a second-side supply valve 106, a first-side drain valve 108, and a second-side drain valve 110. First-side supply valve 104 may be disposed between pump discharge passage 84 and actuator passage 92 that leads to a first side of the rotary actuator(s) shown in FIG. 2. Second-side supply valve 106 may be disposed between pump discharge passage 84 and actuator passage 90 that leads to a second side of the rotary actuator(s). First-side drain valve 108 may be disposed between actuator passage 92 and pump intake passage 82. Second-side drain valve 110 may be disposed between actuator passage 90 and pump intake passage 82. First- and second-side supply valves 104, 106 may be used to selectively meter fluid flow into the associated rotary actuator(s) in different directions, while first- and second-side drain valves 108, 110 may be used to selectively meter fluid flow out of the rotary actuator (s) in different directions.

Valves 96-110 may be substantially identical and each include a variable-position, spring-biased valve element, for example a poppet or spool element, that is solenoid actuated and configured to move to any position between a first end-position at which fluid is allowed to flow through the respective valve, and a second end-position at which fluid flow is substantially blocked. It is contemplated, however, that one or more of valves 96-110 may include a different number and/or type of elements than described above such as, for example, a fixed-position valve element and/or a valve element that is hydraulically actuated, mechanically actuated, pneumatically actuated, or actuated in another suitable manner. It is further contemplated that some or all of valves 96-110 may be combined and include a fewer number of valve elements, as desired. For example a single spool valve (not shown) may be utilized to regulate all head-end flows associated with hydraulic cylinder 26, while another spool valve (not shown) may be utilized to regulate all rod-end flows.

As shown in FIG. 2, one of hydraulic cylinders 26 may be connected to an accumulator 112. For example, only first chamber 52 of only the right-most hydraulic cylinder 26 may be connected to accumulator 112 via a passage 114. Accumulator 112 may embody, for example, a compressed gas, membrane/spring, or bladder type of accumulator configured to accumulate pressurized fluid from passage 114 when a pressure of the fluid exceeds a gas pressure of accumulator 112, and to discharge pressurized fluid into passage 114 when the pressure of the fluid falls below the gas pressure. The pressure of the fluid within passage 114 may exceed the gas pressure of accumulator 112 when the associated hydraulic cylinder 26 is retracting and fluid is being forced from first chamber 52 into passage 114. The pressure of the fluid within passage 114 may fall below the gas pressure of accumulator 112 when the associated hydraulic cylinder 26 is extending and fluid is being drawn into first chamber 52 from passage 114. Accumulator 112 may always be fluidly connected to first chamber 52 via passage 114 (i.e., fluid flow through passage 114 may not be intentionally blocked during operation of machine 10), and first chamber 52 may always be substantially isolated from pump 80.

During operation of machine 10, the operator of machine 10 may utilize interface device 46 to provide a signal that identifies a desired movement of the various linear and/or rotary actuators to a controller 140. Based upon one or more signals, including the signal from interface device 46 and, for example, signals from various pressure sensors (not shown) and/or position sensors (not shown) located throughout hydraulic system 72, controller 140 may command movement of the different valves and/or displacement changes of the different pumps and motors to advance a particular one or more of the linear and/or rotary actuators to a desired position in a desired manner (i.e., at a desired speed and/or with a desired force).

Controller 140 may embody a single microprocessor or multiple microprocessors that include components for controlling operations of hydraulic system 72 based on input from an operator of machine 10 and based on sensed or other known operational parameters. Numerous commercially available microprocessors can be configured to perform the functions of controller 140. It should be appreciated that controller 140 could readily be embodied in a general machine microprocessor capable of controlling numerous machine functions. Controller 140 may include a memory, a secondary storage device, a processor, and any other components for running an application. Various other circuits may be associated with controller 140 such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and performance are desired. The disclosed hydraulic system may provide for improved efficiency through the use of closed-loop technology. The disclosed hydraulic system may provide for an efficient, yet controllable, system through the use of accumulator 112. Operation of hydraulic system 72 will now be described.

During operation of machine 10, an operator located within station 20 may command a particular motion of work tool 14 in a desired direction and at a desired velocity by way of interface device 46. One or more corresponding signals generated by interface device 46 may be provided to controller 140 indicative of the desired motion, along with machine performance information, for example sensor data such a pressure data, position data, speed data, pump or motor displacement data, and other data known in the art.

In response to the signals from interface device 46 and based on the machine performance information, controller 140 may generate control signals directed to the stroke adjusting mechanism of pump 80 and to valves 96-110. For example, to drive the rotary actuator(s) at an increasing speed in a first direction, controller 140 may generate a control signal that causes pump 80 of circuit 74 to increase its displacement and discharge fluid into pump intake passage 82 at a greater rate, while maintaining one of first- or second-side supply valves 104, 106 and the other of first- or second-drain valves 108, 110 in a fully open position (depending on desired rotational direction). After fluid from pump 80 passes into and through the rotary actuator(s) via pump intake passage 82, the fluid may return to pump 80 via pump discharge passage 84. To reverse the motion of the rotary actuator(s), the open/closed configuration of supply/drain valves 104-110 may be switched.

The operator may similarly request movement of hydraulic cylinders 26. For example, the operator may request via interface device 46 that hydraulic cylinders 26 be retracted at an increasing speed. When this occurs, controller 140 may generate a control signal that causes pump 80 to increase its displacement and discharge fluid into pump intake passage 82 at a greater rate. In addition, controller 140 may generate a control signal that causes rod-end supply valve 98 and head-end drain valve 100 to move to a fully open position. Head-end supply valve 96 and rod-end drain valve 102 may be closed at this time. During the retracting movement, fluid from first chamber 52 of the left-most hydraulic cylinder 26 shown in FIG. 2 may be returned to pump 80 via passages 86 and 82, while the fluid within first chamber 52 of the right-most hydraulic cylinder 26 may be forced into accumulator 112 via passage 114.

To reverse the motion of hydraulic cylinders 26, the open/closed configuration of head- and rod-end supply/drain valves 96-102 may be switched. In particular, controller 140 may generate a control signal that causes head-end supply valve 96 and rod-end drain valve 102 to move to a fully open position. Rod-end supply valve 98 and head-end drain valve 100 may be closed at this time. During the extending movement of hydraulic cylinders 26, fluid from pump 80 may flow into first chamber 52 of the left-most hydraulic cylinder 26 via passages 84 and 86, while the fluid within accumulator 112 may be forced back into first chamber 52 of the right-most hydraulic cylinder 26 via passage 114.

The operator of machine 10 may, at times, request simultaneous movement of the rotary actuator(s) and hydraulic cylinders 26. In response to the signals from interface device 46 and based on the machine performance information, controller 140 may generate corresponding control signals directed to the stroke adjusting mechanism of pump 80 to adjust the output of pump 80. In order to control the motion of hydraulic cylinders 26 independently from the motion of the rotary actuator(s), however, the fluid flow into hydraulic cylinders 26, the rotary actuator(s), or both hydraulic cylinders 26 and the rotary actuators may need to be selectively metered. For example, for a given movement velocity of hydraulic cylinders 26, an operator request for increased velocity of the rotary actuator(s) may cause an increase in pump output that could affect the velocity of both hydraulic cylinders 26 and the rotary actuator(s). Accordingly, in this situation, the flow rate of fluid into hydraulic cylinders 26 may need to be selectively metered at the time of pump output increase, such that the given velocity of hydraulic cylinders 26 remains substantially constant. Similarly, for a given rotational velocity of the rotary actuator(s), an operator request for increased velocity of hydraulic cylinders 26 may result in both an increase in the output of pump 80 and a simultaneous metering of fluid directed into the rotary actuator(s). The opposite may also be true during an operator request for decreased velocity.

In the disclosed embodiment of hydraulic system 72, fluid discharged by the linear and rotary actuators may be directed immediately back to pump 80, such that significant energy is not unnecessarily wasted in the actuation process. That is, pressurized fluid still containing some energy may be directed back through pump 80, rather than into a low-pressure tank, thereby recycling the energy and requiring less power from power source 18. Thus, embodiments of the disclosure may provide improved energy usage and conservation, as compared to an open-loop system. In addition, the ability to control some operations of hydraulic system 72 in a meterless fashion through the use of pump regulation may allow for a further increase in efficiency.

The disclosed hydraulic system may also provide for a reduction in fluid makeup and relief capacity. Specifically, because accumulator 112 may be used to accumulate fluid from and discharge fluid into first chamber 52 of one hydraulic cylinder 26, the fluid flows through circuit 74 and pump 80 may be substantially balanced. That is, the flow rate of fluid entering hydraulic cylinders 26 (e.g., entering second chambers 54) from circuit 74 may be substantially equal to the flow rate of fluid simultaneously discharging from hydraulic cylinders 26 back into circuit 74 (i.e., head-end flow from one cylinder=rod-end flows from two cylinders, the remaining head-end flow being accommodated by accumulator 112). Accordingly, hydraulic system 72 may have a reduced need for makeup or relief fluid.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:

a pump having variable-displacement;

a first linear actuator and a second linear actuator coupled to operate in tandem and connected to the pump in closed-loop manner, each of the first and second linear actuators having a first chamber and a second chamber separated by a piston;

an accumulator in fluid communication with the second chamber of only the second linear actuator;

an inlet passage connected to the pump;

a discharge passage connected to the pump;

a first valve disposed between the inlet passage and the first chambers of the first and second linear actuators;

a second valve disposed between the inlet passage and the second chamber of the first linear actuator;

a third valve disposed between the discharge passage and the first chambers of the first and second linear actuators; and a fourth valve disposed between the discharge passage and the second chamber of the first linear actuator.

2. The hydraulic system of claim 1, wherein the first chambers of the first and second linear actuators are fluidly connectable in parallel to pump.

3. The hydraulic system of claim 2, wherein:

the second chamber of the first linear actuator is connected to pump; and the second chamber of the second linear actuator is isolated from pump.

4. The hydraulic system of claim 1, wherein each of the first, second, third, and fourth valves is an independent metering valve.

5. The hydraulic system of claim 4, further including a rotary actuator connected to the pump in closed-loop manner, in parallel with the first and second linear actuators.

6. The hydraulic system of claim 5, further including:

a fifth valve disposed between the inlet passage and the a first side of the rotary actuator;

a sixth valve disposed between the inlet passage and a second side of the rotary actuator;

a seventh valve disposed between the discharge passage and the first side of the rotary actuator; and a eighth valve disposed between the discharge passage and the second side of the rotary actuator.

7. The hydraulic system of claim 6, wherein:

each of the fifth, sixth, seventh, and eighth valves is an independent metering valve; and the rotary actuator is a fixed displacement motor.

8. The hydraulic system of claim 7, wherein:

the first, second, third, and fourth valves together are configured to selectively switch a fluid flow direction into the first and second linear actuators; and the fifth, sixth, seventh, and eighths valves together are configured to selectively switch a fluid flow direction into the rotary actuator.

9. The hydraulic system of claim 5, wherein:

the first and second linear actuators are boom cylinders configured to move a boom of a machine; and the accumulator is configured to accumulate fluid during lowering of the boom.

10. The hydraulic system of claim 9, wherein the rotary actuator is a travel motor.

11. The hydraulic system of claim 1, wherein each of the second chambers of the first and second linear actuators is a head-end chamber having a pressure area about equal to two times a pressure area of the first chambers of each of the first and second linear actuators.

12. A hydraulic system, comprising:

a pump having variable-displacement;

a first hydraulic cylinder and a second hydraulic cylinder coupled to raise and lower a boom in tandem and connected to the pump in closed-loop manner, each of the first and second hydraulic cylinders having a rod-end chamber fluidly connectable in parallel to the pump and a head-end chamber separated from the rod-end chamber by a piston;

an accumulator in fluid communication with the head-end chamber of only the second hydraulic cylinder, wherein the head-end chamber of the second hydraulic cylinder is isolated from pump;

an inlet passage connected to the pump;

an discharge passage connected to the pump;

a first independent metering valve disposed between the inlet passage and the rod-end chambers of the first and second hydraulic cylinder;

a second independent metering valve disposed between the inlet passage and the head-end chamber of the first hydraulic cylinder;

a third independent metering valve disposed between the discharge passage and the rod-end chambers of the first and second hydraulic cylinders; and a fourth independent metering valve disposed between the discharge passage and the head-end chamber of the first hydraulic cylinder.

13. The hydraulic system of claim 12, wherein each of the head-end chambers of the first and second hydraulic cylinders is about equal to two times a pressure area of the rod-end chambers of each of the first and second hydraulic cylinders.

14. A method of operating a hydraulic system, comprising:

pressurizing fluid with a pump;

directing fluid pressurized by the pump into first and second linear actuators operating in tandem and returning fluid from the first and second linear actuators to the pump via a closed-loop circuit; and accumulating fluid from and discharging accumulated fluid into a head-end chamber of only the second linear actuator, wherein:

directing fluid pressurized by the pump into the first and second linear actuators includes:

directing fluid into rod-end chambers of the first and second linear actuators in parallel; and directing fluid into the head-end chamber of the first linear actuator simultaneously with accumulated fluid discharging into the head-end chamber of the second linear actuator; and returning fluid from the first and second linear actuators to the pump includes:

returning fluid from the rod-end chambers of the first and second linear actuators in parallel; and returning fluid from the head-end chamber of the first linear actuator simultaneously with accumulation of fluid from the head-end chamber of the second linear actuator.

15. The method of claim 14, further including selectively metering the fluid directed into the first and second linear actuators.

16. The method of claim 14, further including directing fluid pressurized by the pump into a rotary actuator in parallel with the first and second linear actuators via the closed-loop circuit.

17. The method of claim 16, further including selectively activating a valve arrangement associated with the first and second linear actuators and a valve arrangement associated with the rotary actuator to switch fluid flow directions into the first and second linear and rotary actuators.

* * * * *